(12) United States Patent
Fujinami et al.

(10) Patent No.: US 8,470,286 B2
(45) Date of Patent: Jun. 25, 2013

(54) PROTON CONDUCTIVE MATERIAL

(75) Inventors: Tatsuo Fujinami, Hamamatsu (JP); Takuya Mase, Hamamatsu (JP); Masayoshi Takami, Hamamatsu (JP)

(73) Assignees: Toyota Jidosha Kabushiki Kaisha, Toyota-shi (JP); National University Corporation Shizuoka University, Shizuoka-shi (JP)

( * ) Notice: Subject to any disclaimer, the term of this patent is extended or adjusted under 35 U.S.C. 154(b) by 561 days.

(21) Appl. No.: 12/678,886

(22) PCT Filed: Sep. 18, 2008

(86) PCT No.: PCT/IB2008/002433
§ 371 (c)(1), (2), (4) Date: Mar. 18, 2010

(87) PCT Pub. No.: WO2009/037553
PCT Pub. Date: Mar. 26, 2009

(65) Prior Publication Data
US 2010/0196791 A1    Aug. 5, 2010

(30) Foreign Application Priority Data

Sep. 21, 2007 (JP) .................................. 2007-246203
Sep. 21, 2007 (JP) .................................. 2007-246208

(51) Int. Cl.
*C01B 7/19* (2006.01)

(52) U.S. Cl.
USPC ........................................................ 423/483

(58) Field of Classification Search
USPC ........................................................ 423/483
See application file for complete search history.

(56) References Cited

U.S. PATENT DOCUMENTS

2006/0083962 A1    4/2006    Takekawa et al.

FOREIGN PATENT DOCUMENTS

| EP | 1 391 480 A1 | 2/2004 |
|---|---|---|
| JP | 2002-193861 A | 7/2002 |
| JP | 2003-281931 A | 10/2003 |
| JP | 2004-055181 A | 2/2004 |
| JP | 2004-281063 A | 10/2004 |
| JP | 2005-019234 A | 1/2005 |
| JP | 2005-025974 A | 1/2005 |
| JP | 2006-120409 A | 5/2006 |
| JP | 2006-147478 A | 6/2006 |
| JP | 2007-080694 A | 3/2007 |
| JP | 2007-115647 A | 5/2007 |
| KR | 100 739 643 B1 | 7/2007 |
| WO | WO 2007/069867 A1 | 6/2007 |
| WO | WO 2007/116435 A1 | 10/2007 |

OTHER PUBLICATIONS

Xu et al.: *Ion exchange membranes: State of their development and perspective*, Journal of Membrane Science, Elsevier Scientific Publ. Company, Amsterdam, NL, vol. 263, No. 1-2, Oct. 15, 2005, pp. 1-29.

Deng Q., et al: *TGA-FTi.r.investigation of the thermal degradation of Nafion® and Nafion®/[silicon oxide]-based nanocomposites*, Polymer, Elsevier Science Publishers B.V., GB, vol. 39, No. 24, Nov. 1, 1998, pp. 5961-5972.

Tadanaga K, et al.: *Inorganic-organic hybrid films using epoxycyclohexylethyltrimethoxysilane and orthophosphoric acid for PEFC operated at medium temperatures*, Solid State Ionics, North Holland Pub. Company, Amsterdam, NL, vol. 176, No. 39-40, Dec. 1, 2005, pp. 2997-2999.

*Primary Examiner* — Edward Johnson
(74) *Attorney, Agent, or Firm* — Kenyon & Kenyon LLP

(57) ABSTRACT

A proton conductive material in which hollow inorganic fine particles that have through holes on a surface of the hollow inorganic fine particles, that are filled with an electrolyte resin. In addition, a membrane-electrode assembly which has an anode electrode provided on one surface side of a solid polymer electrolyte membrane and including an anode catalyst layer, and a cathode electrode provided on the other surface side of the solid polymer electrolyte membrane and including a cathode catalyst layer, wherein at least the anode catalyst layer from among the pair of catalyst layers includes the proton conductive material.

11 Claims, 3 Drawing Sheets

PROTON CONDUCTIVE MATERIAL

This is a 371 national phase application of PCT/IB2008/002433 filed 18 Sep. 2008, claiming priority to Japanese Patent Applications No. 2007-246203, and No. 2007-246208, both filed 21 Sep. 2007, the contents of which are incorporated herein by reference.

BACKGROUND OF THE INVENTION

1. Field of the Invention

The present invention relates to a proton conductive material and a method for manufacturing same. The present invention also relates to a membrane-electrode assembly containing the proton conductive material and suitable for a solid polymer electrolyte fuel cell.

2. Description of the Related Art

Fuel cells directly convert chemical energy into electric energy by supplying a fuel and an oxidizing agent to two electrodes that are electrically connected and electrochemically inducing oxidation of the fuel. By contrast with thermal power generation, fuel cells are not affected by the limitations of Carnot cycle and, therefore, demonstrate a high energy conversion efficiency. A fuel cell is usually configured by stacking a plurality of unit cells containing as a basic structure a membrane-electrode assembly in which an electrolyte membrane is sandwiched between a pair of electrodes. Among such fuel cells, fuel cells of a solid polymer electrolyte type that use a solid polymer electrolyte membrane as the electrolyte membrane attracted attention as power sources, in particular, for portable devices and movable bodies, because such fuel cells have a number of advantages including the easiness of miniaturization and operability at a low temperature.

In a fuel cell of a solid polymer electrolyte type, when hydrogen is used as a fuel, a reaction represented by Equation (1) proceeds at an anode (fuel electrode).

$$H_2 \rightarrow 2H^+ + 2e^- \quad (1)$$

Electrons generated according to Equation (1) perform a work in an external load via an external circuit and then reach a cathode (oxidizing agent electrode). Protons generated according to Equation (1) move by electroosmosis from the anode to the cathode inside the solid polymer electrolyte membrane in a state of hydration with water.

Further, when oxygen is used as an oxidizing agent, a reaction represented by Equation (2) proceeds at the cathode.

$$2H^+ + (1/2)O_2 + 2e^- \rightarrow H_2O \quad (2)$$

Water generated at the cathode mainly passes through a gas diffusion layer and is discharged to the outside. Thus, fuel cells are nonhazardous power generating devices producing no wastes other than water.

A polymer electrolyte membrane that may operate in a temperature range of fuel cells of a solid polymer electrolyte membrane type that are usually used is composed of a proton conductive material of an organic polymer type that has a polymer in a basic skeleton or main chain. Problems associated with such proton conductive materials include dimensional changes such as expansion and contraction of the membrane during water absorption and desorption and the occurrence of heat-induced creep or thermal shrinkage. In the operation environment of fuel cells, the water and heat balance is known to change frequently due to a load or external environment, and because dimensional changes of the membrane caused by such changes shorten the electrolyte service life, it becomes a serious problem that may not be in principle resolved with the presently available proton conductive materials of an organic polymer type.

With the foregoing in view, proton conductive materials of an inorganic polymer type are presently being actively developed. Japanese Patent Application Publication No. 2003-281931 (JP-A-2003-281931) discloses that using a mechanical grinding method with respect to a crystalline metal phosphate such as zirconium phosphate makes it possible to attain a high proton conductivity in a proton conductive material containing such a phosphate. Thus, it is shown that a macroordered structure is destroyed in mechanical grinding, and a microordered structure is ensured, while the material is being processed into a powder, thereby making it possible to maintain a high proton conductivity in a high-temperature dry environment.

Further, Japanese Patent Application Publication No. 2004-55181 (JP-A-2004-55181) discloses that by adding a metal phosphate to a phosphosilicate gel or silica gel, it is possible to obtain a high proton conductivity in a proton conductive material. Thus, it is indicated that by adding a metal phosphate having a structure retaining moisture, which is a proton conduction carrier, it is possible to maintain a high proton conductivity in a high-temperature dry environment.

Further, Japanese Patent Application Publication No. 2006-147478 (JP-A-2006-147478) discloses that by adding zirconium phosphate to a polymer compound having ion conductivity, it is possible to attain a high proton conductivity in a proton conductive material. Thus, it is shown that by combining an inorganic substance demonstrating a high proton conductivity at a high temperature with an organic polymer that has a drawback of the proton conductivity decreasing under a high-temperature dry environment, it is possible to overcome this drawback.

An attempt has also been made to develop a new proton conductive material of an organic polymer type. Japanese Patent Application Publication No. 2002-193861 (JP-A-2002-193861) discloses that a fullerene polymer having proton conductivity may be synthesized by introducing a sulfonic acid group into a fullerene, which is a carbon allotrope, and crosslinking the fullerene derivatives with a biphenyl or the like.

Among the aforementioned reference documents, JP-A-2003-281931, JP-A-2004-55181, and JP-A-2006-147478 use metal phosphates, which are inorganic materials. Usually, where an attempt is made to increase the proton conduction capacity of inorganic materials by adding proton conductive groups, hydration proceeds and the material becomes a liquid with high flowability. As a result, the shape retaining ability is extremely poor. Therefore, a limitation is placed on the increase of proton conduction ability of metal phosphates. Further, in the configuration described in JP-A-2002-193861, the number of proton conductive groups that may be directly introduced onto one fullerene molecule, which consists of a limited number of carbon atoms, is obviously limited. Therefore, in this case, too, a limitation is placed on the increase of proton conduction capacity.

Further, in the case of fuel cells of a solid polymer electrolyte type, the fuel and oxidizing agent are usually continuously supplied in a gaseous state (fuel gas, oxidizing agent gas) into the fuel cell. These gases are introduced as far as a three-phase interface that is a contact surface of catalyst particles supported on a support that is an electric conductor and a polymer electrolyte that ensures ion conduction paths, and the above-described reactions represented by Equations (1), (2) proceed. Therefore, porous electrodes in which a polymer electrolyte is homogeneously mixed with catalyst particles are known to be usually used as the electrodes of fuel cells.

However, because catalyst particles, the polymer electrolyte, and the support that is an electric conductor are homogeneously dispersed to a high degree in the electrode, the gas diffusion paths are uniformly narrow and the discharge paths for discharging the generated water from the reaction field to the outside of the system are difficult to ensure. After a fuel cell has been operated for a long time, the gas diffusion paths become even narrower due to accumulation of the generated water, thereby decreasing gas diffusability.

Adjusting the mass ratio of the proton conductive material and electric conductor in the catalyst has heretofore been suggested as means for resolving the problems associated with both the decrease in gas diffusability and the decrease in dischargeability of generated water. Japanese Patent Application Publication No. 2007-80694 (JP-A-2007-80694) discloses that a catalyst layer with excellent initial performance may be provided when the mass ratio of the proton conductive material to the electric conductor is equal to or higher than 0.6 and lower than 0.8.

Alternatively, an attempt has been made to adjust the discharge amount of generated water by providing a hydrophilic layer between a polymer electrolyte membrane and a catalyst layer. Japanese Patent Application Publication No. 2005-25974 (JP-A-2005-25974) discloses a configuration in which a layer composed of a proton conductive material with a hydrophility higher than that of a catalyst layer is provided between a polymer electrolyte membrane and the catalyst layer, thereby resolving both the problems of decrease in the water content ratio in the polymer electrolyte membrane and the problem of decrease in power generation performance caused by excessive amount of moisture in the catalyst layer.

However, in the configurations described both in JP-A-2005-25974 and in JP-A-2007-80694, an organic polymer electrolyte resin having a sulfonic acid group is usually used in the proton conductive material. An organic polymer electrolyte resin having a sulfonic acid group in a structure has poor ability of retaining water for a long time and, therefore, the membrane-electrode assembly deteriorates significantly when the fuel cell is operated under low-humidity conditions. Further, because the organic polymer electrolyte resin is uniformly dispersed in the catalyst layer or hydrophilic layer in the configurations described in JP-A-2005-25974 and JP-A-2007-80694, the catalyst layer lacks porosity, thereby causing decrease in gas diffusability and dischargeability of generated water.

SUMMARY OF THE INVENTION

As described hereinabove, in proton conductive materials of both the organic polymer type and the inorganic polymer type, a limitation is placed on the increase in proton conduction capacity. It is an object of the present invention to provide a proton conductive material in which proton conduction capacity may be increased without losing mechanical properties or shape.

Further, in a catalyst layer in which an organic polymer electrolyte resin is uniformly dispersed, gas diffusability and dischargeability of generated water are limited. With consideration for the fact that a fundamental improvement of a proton conductive material is essential for preventing the deterioration of membrane-electrode assembly under low-humidity conditions, the present invention prevents the deterioration of membrane-electrode membrane by retaining a large amount of water in the catalyst layer and also improves both the gas diffusability and the dischargeability of generated water by employing a catalyst layer of a membrane-electrode assembly that uses a proton conductive material combining water retention ability that allows the proton conductive material to retain a sufficient amount of water with water dischargeability that allows the proton conductive material to remove excess water efficiently.

In a proton conductive material according to the first aspect of the present invention, hollow inorganic fine particles that have through holes on a surface of the hollow inorganic fine particles, and that are filled with an electrolyte resin.

In the proton conductive material of such a configuration, a very large number of proton conductive groups as the end groups of the electrolyte resin loaded into the cavities of central portions of the inorganic fine particles are exposed from the through holes located on the surface of inorganic fine particles, thereby ensuring high proton conductivity. Furthermore, because the electrolyte resin is confined in inorganic fine particles of fixed particle size, the effect of swelling and contraction is small. In addition, even when a state with a high flowability is assumed such that normally occurs where a large number of proton conductive groups are introduced into the electrolyte resin structure, because the electrolyte resin is retained in the cavities of central portions of inorganic fine particles in accordance with the present invention, both the shape retention ability and proton conductivity are increased. As a result, for example, even when the proton conductive material is used in an electrolyte membrane of a fuel cell, dimensional changes are hardly induced by the water and heat balance. Alternatively, even when the proton conductive material is used together with an electrolyte resin as a catalyst layer, no clogging of gas diffusion paths caused by liquefaction occurs and a high proton conductivity may be maintained.

In the proton conductive material according to the first aspect, the electrolyte resin may be exposed on the surface of the proton conductive material via the through holes.

Further, in the proton conductive material according to the first aspect, the electrolyte resin may have a Si—O skeleton.

The proton conductive material of such a configuration has a strong polymer chain and, therefore, excels in mechanical properties.

Further, in the proton conductive material according to the first aspect, the inorganic particles may be $SiO_2$.

The proton conductive material of such a configuration has a rigid shell provided by $SiO_2$ and, therefore, excels in mechanical properties.

Further, the proton conductive material according to the first aspect may have an ion exchange capacity higher than an ion exchange capacity of the inorganic fine particles.

In the proton conductive material of such a configuration, a proton conduction capacity equal to or higher than that of inorganic fine particles may be ensured by loading the electrolyte resin into the inorganic fine particles.

Further, in the proton conductive material according to the first aspect, the ion exchange capacity may be equal to or higher than 0.5 meq/g.

The proton conductive material of such a configuration has sufficient proton conduction capacity, for example, when used in an electrolyte membrane of a fuel cell.

Further, in the proton conductive material according to the first aspect, the average particle size may be 0.1 to 10 μm.

The proton conductive material of such a configuration may be used in an electrolyte membrane of an adequate thickness.

Further, in the proton conductive material according to the first aspect, a bulk density of the inorganic fine particles may be equal to or less than 20% a true density of the inorganic fine particles.

In the proton conductive material of such a configuration, a sufficient amount of the electrolyte resin may be loaded into the inorganic fine particles.

Further, in the proton conductive material according to the first aspect, a bulk density of the inorganic fine particles may be equal to or higher than 5% a true density of the inorganic fine particles.

A method for manufacturing a proton conductive material according to the second aspect in accordance with the present invention includes mixing a monomer having one of a sulfonic acid group and a sulfonic acid precursor group in a dispersion liquid in which hollow inorganic fine particles that have through holes on a surface of the hollow inorganic fine particles are dispersed in a solvent, loading the monomer into the inorganic fine particles under a reduced pressure, polymerizing the monomer after the monomer has been loaded, and when the monomer having the sulfonic acid precursor group is used, converting the sulfonic acid precursor group into a sulfonic acid group after loading or polymerizing the monomer.

With the method for manufacturing a proton conductive material of such a configuration, the proton conductive material in accordance with the present invention may be obtained. Further, the monomer may be loaded into the inorganic fine particles from the through holes of the inorganic fine particles by a simple operation of placing the inorganic fine particles and the monomer under a reduced pressure. Further, the polymer may be loaded into the inorganic fine particles by a subsequent polymerization reaction.

The membrane-electrode assembly according to the third aspect of the present invention includes an anode electrode having an anode catalyst layer, provided on one surface side of a solid polymer electrolyte membrane, and a cathode electrode having a cathode catalyst layer, provided on the other surface side of the solid polymer electrolyte membrane, wherein at least the anode catalyst layer from among the pair of catalyst layers contains the proton conductive material.

In the membrane-electrode assembly of such a configuration, the proton conductive material having both the water retention ability and the water dischargeability is used in the catalyst layer. Therefore, power generation characteristics do not decrease under low-humidity conditions, as in the case where a typical polymer electrolyte having sulfonic acid groups in a structure is used as a proton conductive material. In addition, the dischargeability of generated water in the course of electrochemical reactions may be increased. Further, because a material having shells of inorganic fine particles is used as a proton conductive material in the catalyst layer, gaps are present around the particles owing to the particulate shape of the proton conductive material. Therefore, gas diffusability within the catalyst layer may be increased over that attained when a typical catalyst layer is used in which an organic polymer electrolyte resin of an indeterminate shape is uniformly dispersed and the resin adheres around the catalyst grains.

Further, in the membrane-electrode assembly according to the third aspect, both the anode catalyst layer and the cathode catalyst layer may contain the proton conductive material.

In the membrane-electrode assembly of such a configuration, water distribution in the cathode catalyst layer may be controlled by using suitable amounts of the proton conductive material in both the anode catalyst layer and the cathode catalyst layer.

In accordance with the present invention, a proton conductive material in which proton conduction capacity may be increased without losing mechanical properties or shape may be provided by loading a polymer having proton conductive groups into hollow inorganic fine particles having through holes on the surface thereof. Further, when the proton conductive material is used, for example, in an electrolyte membrane of a fuel cell, an electrolyte membrane having high endurance may be obtained without causing dimensional changes. In addition, the polymer may be loaded into the inorganic fine particles by a subsequent polymerization reaction by means of a simple operation of loading the monomer into the inorganic fine particles from the through holes of the inorganic fine particles.

As described hereinabove, within the framework of the conventional technology, membrane-electrode assemblies using a catalyst layer having uniformly dispersed therein an organic polymer electrolyte resin having sulfonic acid groups in a structure still may be improved with respect to three properties: water retention ability, water dischargeability, and gas diffusibility. In accordance with the present invention, problems associated with these three properties may be simultaneously resolved and power generation performance may be improved by using a proton conductive material in which hollow inorganic fine particles having through holes on the surface thereof are filled with an electrolyte resin.

BRIEF DESCRIPTION OF THE DRAWINGS

The foregoing and further objects, features and advantages of the invention will become apparent from the following description of preferred embodiments with reference to the accompanying drawings, wherein like numerals are used to represent like elements and wherein.

DETAILED DESCRIPTION OF EMBODIMENTS

In the proton conductive material in accordance with the present invention, an electrolyte resin is loaded into hollow inorganic fine particles having through holes on the surface thereof.

Further, the membrane-electrode assembly according to the present invention includes an anode electrode provided on one surface side of a solid polymer electrolyte membrane and having an anode catalyst layer, and a cathode electrode provided on the other surface side of the solid polymer electrolyte membrane and having a cathode catalyst layer, wherein at least the anode catalyst layer from among the pair of catalyst layers contains the proton conductive material.

Figure 1:
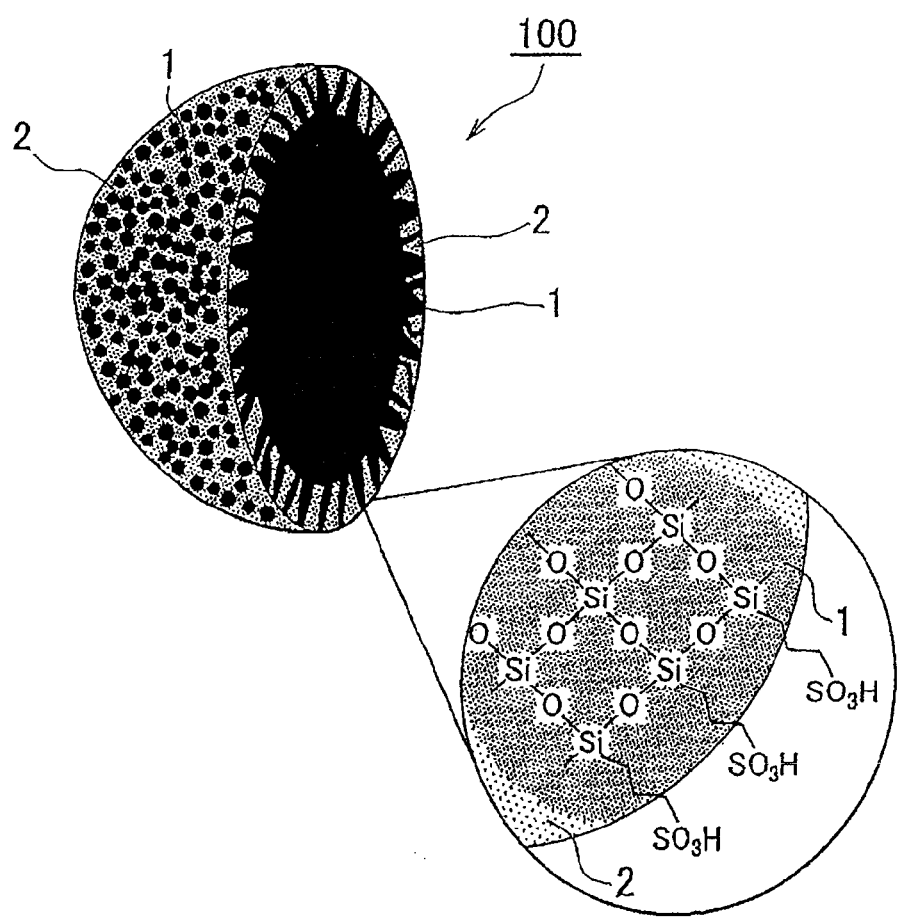
FIG. 1 is a cross-sectional view of a powdered proton conductive material in a typical example of the proton conductive material in accordance with the present invention.

The proton conductive material in accordance with the present invention will be described below in greater details with reference to the appended drawings. FIG. 1 is a cross-sectional view of a powdered proton conductive material in a typical example of the proton conductive material in accordance with the present invention. An enlarged drawing of a cross-section that illustrates schematically a structural formula of the electrolyte resin is shown in the circle in the lower right portion of the figure. Broken lines connecting silicon atoms and sulfonic acid groups in the circle in the lower right portion of the figure represent alkyl chains. A proton conductive material 100 includes an electrolyte resin 1 and inorganic fine particles 2, and the hollow inorganic fine particles 2 are filled with the electrolyte resin 1. The inorganic fine particles 2 have a large number of through holes, and the electrolyte resin 1 is exposed via the through holes on the particle surface.

As indicated by a structural formula that is shown schematically in the circle in the lower right portion of FIG. 1, the electrolyte resin 1 has a Si—O skeleton preferably. Specifically, a polysiloxane electrolyte may be used as electrolyte resin. The electrolyte resin 1 has proton conductive groups such as sulfonic acid groups. As shown in the circle in the lower right portion of FIG. 1, the sulfonic acid groups are exposed on the surface of the proton conductive material 100 via the through holes of the inorganic fine particles 2.

A polymer electrolyte that is usually used in fuel cells may be also used as the electrolyte resin 1. Examples of polymer electrolytes referred to herein include fluoropolymer electrolytes such as perfluorocarbonsulfonic acid resins represented by Nafion® and also hydrocarbon-based polymer electrolytes having a protonic acid group (proton conductive group) such as a sulfonic acid group, a carbonic acid group, a phosphonic acid group, and a boronic acid group introduced in hydrocarbon-based polymers, for example, engineering plastics such as polyetheretherketones, polyetherketones, polyethersulfones, polyphenylene sulfide, polyphenylene ethers, polyparaphenylene, and plastics for general applications such as polyethylene, polypropylene, and polystyrene.

The inorganic fine particles 2 are required to be capable of ensuring a sufficient filling amount inside thereof, and when a monomer serving as a starting material for the electrolyte resin 1 is loaded, small internal resistance to the flow and easiness of filling are required. The inorganic fine particles are not limited to perfect hollow bodies and may also have an internal structure containing columns of having partitions. However, where the internal structure is a porous structure with excessive compactness, the aforementioned requirements may not be met. Therefore, such compact porous bodies are not included.

Further, the through holes that are present in the surface of the inorganic fine particles 2 are required to produce little resistance to the flow of a monomer serving as a starting material for the electrolyte resin 1 when the monomer is loaded, so that the monomer may be easily loaded. Further, the through holes are also required to have a size within an adequate range such that the electrolyte resin produced by addition polymerization or polycondensation of the monomer inside the particle does not flow out of the particle.

In order to satisfy the above-described requirements relating to the inside of the inorganic fine particles 2 and properties of through holes, the inorganic fine particles 2 in accordance with the present invention are from $SiO_2$. Another advantage is that the proton conductive material 100 excels in mechanical properties due to a rigid shell provided by $SiO_2$.

The proton conductive material 100 in accordance with the present invention has an ion exchange capacity higher than an ion exchange capacity of the inorganic fine particles 2 themselves, and the ion exchange capacity of the proton conductive material 100 is equal to or higher than 0.5 meq/g. Where the ion exchange capacity of the proton conductive material 100 is lower than the ion exchange capacity of the inorganic fine particles 2, the ion conduction capacity is difficult to increase even by adding ion conductive groups. Further, where the ion exchange capacity of the proton conductive material 100 is less than 0.5 meq/g, for example, when the proton conductive material 100 is used for an electrolyte membrane of a fuel cell, sufficient power generation efficiency sometimes may not be obtained.

Further, the average particle size of the proton conductive material 100 in accordance with the present invention is 0.1 to 10 μm, and the bulk density of the inorganic fine particles 2 is equal to or less than 20% the true density of the inorganic fine particles 2. Where the average particle size of the proton conductive material 100 is less than 0.1 μm, the size is sometimes insufficient to retain a sufficient amount of loaded electrolyte resin. Conversely, where the average particle size of the proton conductive material 100 exceeds 10 μm, the particles sometimes may not be used in an electrolyte membrane of adequate thickness. Further, where the bulk density of the inorganic fine particles 2 exceeds 20% the true density of the inorganic fine particles 2, loading of a sufficient amount of electrolyte resin is difficult to expect. From the standpoint of avoiding the particle fracture, the bulk density of the inorganic fine particles 2 may be equal to or higher than 5% the true density of the inorganic fine particles 2.

With the proton conductive material of such a configuration, even when a state with a high flowability is assumed such that normally occurs where a large number of proton conductive groups are introduced into the electrolyte resin structure, because the electrolyte resin is retained in the cavities of central portions of inorganic fine particles in accordance with the present invention, both the shape retention ability and proton conductivity are increased. As a result, a large amount of electrolyte resin may be loaded, while maintaining mechanical properties and without liquefying the electrolyte resin that has been loaded into the cavities in the central portion of inorganic fine particles. Furthermore, the proton conductive groups are exposed from a large number of through holes on the particle surface. Therefore, sufficient proton conductive paths are formed. In addition, when, the proton conductive material is used, for example, in an electrolyte membrane of a fuel cell, the proton conductive material configuration ensures that the electrolyte resin is loaded into the inorganic fine particles without causing dimensional changes of the proton conductive material. Therefore, water and heat balance cause no dimensional changes in the electrolyte membrane and an electrolyte membrane with high endurance may be obtained. Alternatively, even when the proton conductive material is used together with an electrolyte resin as a catalyst layer, no clogging of gas diffusion paths caused by liquefaction occurs and a high proton conductivity may be maintained. Further, because the electrolyte resin has a Si—O skeleton and a strong polymer chain, excellent mechanical properties are obtained and the proton conductive groups do not leak to the outside of the proton conductive material. In addition, by using inorganic fine particles from $SiO_2$ a rigid shell is ensured and, therefore, the shape may be retained, without contraction or expansion due to the water and heat balance. In the proton conductive material having the aforementioned ion exchange capacity, a proton conduction capacity equal to or higher than that of the inorganic fine particles may be obtained by loading the electrolyte resin into the inorganic fine particles and, for example, when the proton conductive material is used for an electrolyte membrane of a fuel cell, a sufficient proton conduction capacity may be demonstrated. Moreover, the proton conductive material having the above-described average particle size and bulk density is optimum for applications to electrolyte membranes of adequate size and a sufficient amount of electrolyte resin may be loaded into the inorganic fine particles.

The method for manufacturing a proton conductive material in accordance with the present invention includes mixing a monomer having a sulfonic acid group or a precursor group thereof in a dispersion liquid in which hollow inorganic fine particles having through holes on the surface thereof are dispersed in a solvent, loading the monomer into the inorganic fine particles under a reduced pressure, polymerizing the monomer, and when a monomer having a precursor group is used, converting the precursor group into a sulfonic acid group after loading or polymerizing the monomer.

For the inside of the inorganic fine particles 2 and through holes to satisfy the above-described requirements, the inorganic fine particles 2 may be $SiO_2$ or the inorganic fine particles may use microcapsules (trade name: Washin Microcapsule) containing $SiO_2$ as the main component. Other porous hollow bodies in the form of inorganic fine particles may be also used. Examples of suitable materials other than $SiO_2$ include alumina and zeolites. However, mesoporous silica is not suitable for hollow inorganic fine particles used in accordance with the present invention because the electrolyte resin easily flows out from inside the particles and the electrolyte resin is difficult to retain. As a method for manufacturing the inorganic fine particles, a styrene monomer is polymerized in the presence of a vinyl monomer having a cation surfactant group and polystyrene fine particles having ionic groups on the surface are obtained. Silica is formed on the surface of the polystyrene fine particle surface by conducting a hydrolysis condensation reaction of tetraethoxysilane with the polystyrene fine particles. Hollow silica microcapsules are then obtained by dissolving and removing polystyrene with a solvent. Prior to usage, the microcapsules are treated with hydrochloric acid to remove impurities in advance.

An adequate dispersion liquid such that may be distilled off under reduced pressure conditions during monomer filling has to be used. Examples of suitable dispersion liquid include water, alcohols such as methanol, ethanol, and propanol, organic solvents such as N-methyl-2-pyrrolidone (NMP) and N,N-dimethylacetamide (DMA), or mixtures of these organic solvents, or mixtures of these organic solvents with water.

The polymerization of a monomer as referred to herein includes addition polymerization and polycondensation. A resin that is a polymer having a high molecular weight from the very beginning may not be used because such resin is difficult to load under a reduced pressure. Therefore, a monomer may be used for loading.

A compound that becomes a repeating unit of the electrolyte resin that has to be loaded into the cavities of hollow inorganic fine particles may be used as the monomer. For example, when perfluorocarbonsulfonic acid that has been used in the general field of solid polymer fuel cells is wished to be loaded into the inorganic fine particles, a monomer forming a fluorocarbon skeleton such as fluoroethylene may be used. When an electrolyte resin having a Si—O skeleton is to be loaded into the inorganic fine particles, a hydrocarbonoxysilane compound and/or a silanol compound having a sulfonic acid group or a precursor group thereof may be used. The suitable hydrocarbonoxysilane compound as referred to herein is a compound having a structure in which a sulfonic acid group or a precursor group thereof is directly or indirectly bound to a silicon atom, and a hydrocarbonoxy group that may contain a dissimilar atom is bound to the same silicon atom. The hydrocarbonoxy group as referred to herein is a group having a structure in which an oxygen atom is bound to an aliphatic or aromatic hydrocarbon group, for example, an alkoxy group or an aryloxy group, wherein the oxygen atom is bound to a silicon atom. The hydrocarbonoxy group may contain a dissimilar atom. When a sulfonic acid group or a precursor group thereof is indirectly bound to a silicon atom, it may be bound, for example, via an aliphatic or aromatic hydrocarbon group, and the hydrocarbon group may contain a dissimilar atom. Further, the suitable silanol compound as referred to herein is a compound having a structure in which a sulfonic acid group or a precursor group thereof is directly or indirectly bound to a silicon atom, and a hydroxyl group is bound to the same silicon atom. For example, a silicon compound in which a sulfonic acid hydrocarbon group (may contain a dissimilar atom) and a hydroxyl group (—OH) and/or an alkoxy group or an aryloxy group (may contain a dissimilar atom) are bound to a Si atom may be used as the hydrocarbonoxysilane compound and/or the silanol compound. More specific examples include compounds having a structure represented by Formula (1), Formula (2), and Formula (3) below.

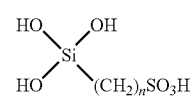

Formula (1)

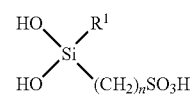

Formula (2)

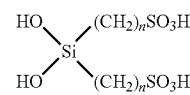

Formula (3)

(wherein, $R^1$ is an aliphatic hydrocarbon group having 1 to 3 carbon atoms or an aromatic hydrocarbon group having 6 to 10 carbon atoms; n=2 to 4).

A compound from which the above-described monomer having a sulfonic acid group may be derived may be used as the monomer having a precursor group of a sulfonic acid group. Examples of monomers corresponding to the Formula (1), Formula (2), and Formula (3) above include monomers having structures represented by Formula (4), Formula (5), and Formula (6) below.

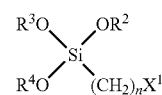

Formula (4)

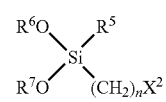

Formula (5)

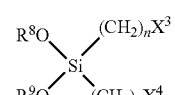

Formula (6)

(wherein, $R^2$ to $R^9$ are, independently from each other, a hydrogen atom or a functional group selected from aliphatic hydrocarbon groups, for example having 1 to 3 carbon atoms, that may contain a dissimilar atom, and aromatic hydrocarbon groups, for example having 6 to 10 carbon atoms, that may contain a dissimilar atom. Further, n=2 to 4. $X^1$ to $X^4$ are, independently from each other, a functional group selected from precursor groups of sulfonic acid groups, such as a thiol group, a sulfynyl group, a sulfonic acid fluoride, a sulfonic acid chloride, a sulfonic acid bromide, a sulfonic acid iodide, a lithium sulfonate, a potassium sulfonate, and a sodium sulfonate).

Monomers of two or more kinds may used when the electrolyte resin is synthesized.

For example, when the precursor group is a thiol group or a sulfynyl group, a method of converting the precursor group into a sulfonic acid group may be used as a method for converting the precursor group of sulfonic acid group into the sulfonic acid group. Alternatively, when the precursor group is a sulfonic acid fluoride, a sulfonic acid chloride, a sulfonic acid bromide, a sulfonic acid iodide, a lithium sulfonate, a potassium sulfonate, and a sodium sulfonate, the precursor group may be converted into the sulfonic acid group by adding an acid such as hydrochloric acid or sulfuric acid or by adding a base such as an aqueous solution of sodium hydroxide. Further the precursor groups of the sulfonic acid group are not limited to those described above and also include the compounds in which $X^1$ to $X^4$ in Formulas (4) to (6) above are end olefins. In this case, conversion into alkyl groups having an end sulfonic acid group may be performed by treating with sulfur trioxide and then treating with a base.

The retention force of the electrolyte resin of the proton conductive material after polymerization depends on the average diameter or number of the through holes in the inorganic fine particles and on flowability of the polymerized electrolyte resin, and these parameters are difficult to measure or observe directly. Further, even if these parameters are known, complete evaluation has to be conducted based on the relationship with proton conductivity that is proportional to the loaded amount of the electrolyte resin loaded into the cavities of the inorganic fine particles. From this standpoint, the ion exchange capacity of the proton conductive material remaining in the cavities of the particles, without flowing out even in the below-described hydrothermal treatment, that is the residual ion exchange capacity after the hydrothermal treatment test may be assumed as equal to or higher than 0.5 meq/g.

The proton conductive material in accordance with the present invention may be obtained by the method for manufacturing a proton conductive material of the above-described configuration. A similar operation of placing inorganic fine particles and a monomer together under a reduced pressure makes it possible to load the monomer into the inorganic fine particles from the through holes of the inorganic fine particles. The monomer may be also loaded into the inorganic fine particles by subsequent polymerization reaction and, if necessary, a precursor group of a sulfonic acid group may be converted into the sulfonic acid group by treating with an oxidizing agent such as hydrogen peroxide, an acid such as hydrochloric acid or sulfuric acid, or a base such as an aqueous solution of sodium hydroxide at the final stage. When a precursor group of a sulfonic acid group, in particular a monomer having a thiol group, is used, the cost may be greatly reduced by comparison with that when a monomer having a sulfonic acid group is used. Therefore, the proton conductive material may be manufactured with higher efficiency.

Figure 2:
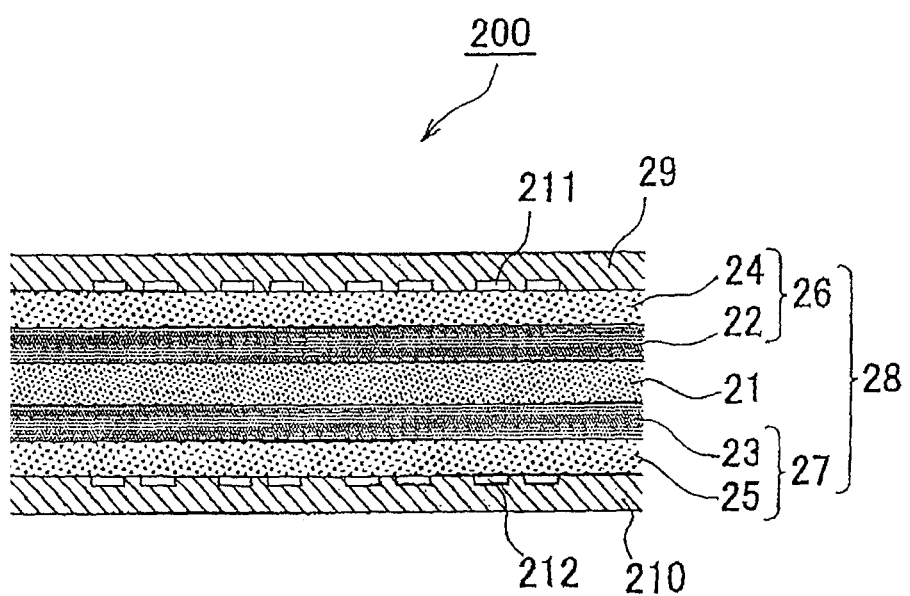
FIG. 2 shows schematically a cross section illustrating the structure of a unit cell constituting the membrane-electrode assembly in accordance with the present invention.

The membrane-electrode assembly in accordance with the present invention will be described below in greater detail with reference to the appended drawings. FIG. 2 shows an example of a unit cell 200 composed of the membrane-electrode assembly in accordance with the present invention. This figure shows schematically a cross section obtained by cutting in the lamination direction. The unit cell 200 of a fuel cell shown in FIG. 2 includes a membrane-electrode assembly 28 composed of a solid polymer electrolyte membrane (may be hereinbelow referred to simply as "electrolyte membrane") having hydrogen ion conductivity and a pair of a cathode electrode 26 and an anode electrode 27 sandwiching the electrolyte membrane 21. The unit cell also includes a pair of separators 29 and 210 that sandwich the membrane-electrode assembly 28 from the outside of the electrodes. Cathode flow channels 211 and 212 are ensured on a boundary of the separator and electrode. A hydrogen gas is supplied on the anode side, and a gas including oxygen (usually, air) is supplied on the cathode side. Usually, a configuration obtained by laminating a catalyst layer and a gas diffusion layer in the order of description from the electrolyte membrane side is used as the electrode. Thus, the cathode electrode 26 is obtained by laminating a cathode catalyst layer 22 and a gas diffusion layer 24, and the anode electrode 27 is obtained by laminating an anode catalyst layer 23 and a gas diffusion layer 25. In the membrane-electrode assembly in accordance with the present invention, at least the anode catalyst layer 23, from among the pair of catalyst layers, includes the proton conductive material.

The solid polymer electrolyte membrane as referred to herein is a polymer electrolyte membrane that is used in fuel cells. As described hereinabove, in addition to fluoropolymer electrolytes such as perfluorocarbonsulfonic acid resins represented by Nafion®, suitable examples of fluoropolymer electrolyte membranes include hydrocarbon-based polymer electrolyte membranes including hydrocarbon-based polymer electrolytes having a protonic acid group (proton conductive group) such as a sulfonic acid group, a carbonic acid group, a phosphoric acid group, and a boronic acid group introduced in hydrocarbon polymers, for example, engineering plastics such as polyetheretherketones, polyetherketones, polyethersulfones, polyphenylene sulfide, polyphenylene ethers, polyparaphenylenes, and plastics for general applications such as polyethylene, polypropylene, and polystyrene.

The catalyst layer may be formed by using a catalyst ink including the proton conductive material in accordance with the present invention, a catalyst, an electrically conductive material, and a polymer electrolyte. Because the proton conductive material in accordance with the present invention is in the form of particles, a simple mixture thereof with a catalyst may lack film forming ability and cohesion ability necessary to form the catalyst layer. For this reason, a polymer electrolyte having a binder function is usually used in the mixture. The polymer electrolyte as referred to herein includes fluoropolymer electrolytes such as perfluorocarbonsulfonic acid resins represented by Nafion® and also hydrocarbon-based polymer electrolytes having a protonic acid group (proton conductive group) such as a sulfonic acid group, a carbonic acid group, a phosphonic acid group, and a boronic acid group introduced in hydrocarbon polymers, for example, engineering plastics such as polyetheretherketones, polyetherketones, polyethersulfones, polyphenylene sulfide, polyphenylene ethers, polyparaphenylenes, and plastics for general applications such as polyethylene, polypropylene, and polystyrene. The weight ratio of the polymer electrolyte admixed to the catalyst support is 3/7 to 7/3.

A usual catalyst in which a catalytic component is supported on electrically conductive particles may be used as the catalyst. The catalytic component is not particularly limited, provided it has catalytic activity with respect to oxidation reaction of fuel of the fuel electrode or reduction reaction of the oxidizing agent of the oxidizing agent electrode, and catalytic components that have been typically used in solid polymer fuel cells may be used. For example, platinum or metals such as ruthenium, iron, nickel, manganese, cobalt, and copper and alloys thereof with platinum may be used.

Electrically conductive carbon materials such as carbon particles, e.g. carbon black, and carbon fibers, and metal materials such as metal particles or metallic fibers may be used as the electrically conductive particles serving as the catalyst support. The electrically conductive particles may also serve as an electrically conductive material for imparting electric conductivity to the catalyst layer.

A method for forming the catalyst layer is not particularly limited. For example, the catalyst layer may be formed on a gas diffusion layer sheet by coating a catalyst ink on the gas diffusion layer surface and drying, or the catalyst layer may be formed on the electrolyte membrane surface by coating the catalyst ink on the electrolyte membrane surface and drying. Alternatively, the catalyst layer may be formed on the electrolyte membrane surface or gas diffusion sheet surface by a method of coating the catalyst ink on a base material surface for transfer, drying to produce a transfer sheet, joining the transfer sheet to the electrolyte membrane or gas diffusion sheet by thermal press bonding or the like, and then peeling the base material film of the transfer sheet.

The catalyst ink may be obtained by dissolving or dispersing the proton conductive material, catalyst, and polymer electrolyte in a solvent. The catalyst ink solvent may be appropriately selected. For example, alcohols such as methanol, ethanol, and propanol, organic solvents such as N-methyl-2-pyrrolidone (NMP) and dimethylsulfoxide (DMSO), or mixtures of these organic solvents, or mixtures of these organic solvents with water may be used. If necessary, in addition to the proton conductive material, catalyst, and electrolyte, the catalyst ink may contain a binder, a water-repellent resin, and other components.

A method for coating and a method for drying the catalyst ink may be appropriately selected. For example, a spraying method, a screen printing method, a doctor blade method, a gravure printing method, and a die coating method may be used for coating. Vacuum drying, thermal drying, and thermal drying under reduced pressure may be used for drying. Specific conditions of vacuum drying and thermal drying are not particularly limited and may be set appropriately. The coating amount of the catalyst ink differs depending on the catalyst ink composition and catalytic capacity of the catalyst metal used in the electrode catalyst, but the amount of catalytic component per unit surface area may be about 0.1 to 2.0 mg/cm$^2$. The catalyst layer thickness is not particularly limited and may be about 1 to 50 μm.

A sheet having gas diffusion ability sufficient to supply a as to the catalyst layer with high efficiency, electric conductivity, and strength required for a material constituting the gas diffusion layer is used as the gas diffusion layer sheet that forms the gas diffusion layer. For example, suitable sheets are composed of electrically conductive porous bodies such as carbonaceous porous materials such as carbon paper, carbon cloth, and carbon felt, and metal meshes or metal porous bodies composed of metals such as titanium, aluminum, copper, nickel, nickel-chromium alloys, copper alloys, silver, aluminum alloys, zinc alloys, lead alloys, titanium alloys, niobium, tantalum, iron, stainless steel, gold, and platinum. The preferred thickness of the electrically conductive body is about 50 to 500 μm.

The gas diffusion layer sheet may include a single layer of the above-described electrically conductive porous body, or a water-repellent layer may be provided on the side thereof facing the catalyst layer. The water repellent layer usually has a porous structure including an electrically conductive powdered body of carbon particles or carbon fibers and a water repellent resin such as polytetrafluoroethylene (PTFE). The water repellent layer is not a necessary component, but the advantage thereof is that water repellency of the gas diffusion layer may be increased and electric contact between the catalyst layer and gas diffusion layer may be improved, while enabling the retention of an appropriate amount of moisture in the catalyst layer and electrolyte membrane. A method for forming the water repellent layer on the electrically conductive porous body is not particularly limited. For example, a water repellent layer ink obtained by mixing an electrically conductive powdered body such as carbon particles, a water repellent resin and, if necessary other components, with a solvent such as an organic solvent, for example, ethanol, propanol, and propylene glycol, water, or mixtures thereof may be coated at least on the side of the electrically conductive porous body that faces the catalyst layer, followed by drying and/or baking. The thickness of the water repellent layer is usually about 1 to 50 μm. Examples of methods for coating the water repellent layer ink on the electrically conductive porous body include a screen printing method, a spraying method, a doctor blade method, a gravure printing method; and a die coating method. The electrically conductive porous body may be also processed so as to ensure efficient discharge of moisture present in the catalyst layer to the outside of the gas diffusion layer by impregnating and coating a water repellent resin such as polytetrafluoroethylene with a bar coater or the like on the side of the electrically conductive porous body that faces the catalyst layer. A membrane-electrode assembly is obtained by appropriately laminating the gas diffusion layer sheet and electrolyte membrane on which the catalyst layer has been formed by the above-described methods, and joining them together by thermal pressure bonding or the like.

The membrane-electrode assembly thus produced is then sandwiched between the separators to form a unit cell. Materials that have electric conductivity and gas sealing ability and may function as collectors and gas sealing bodies may be used as the separators. Specific examples of such separators include carbon separators composed of a composite material of a resin and carbon fibers that has a high concentration of carbon fibers and metal separators using metal materials. Examples of metal separators include separators from metal materials with excellent corrosion resistance or separators coated on the surface thereof with carbon or a metal material having excellent corrosion resistance, thereby providing a coating that increases corrosion resistance.

In typical membrane-electrode assemblies, when a large amount of proton conductive groups are introduced into the structure of electrolyte resin included in the catalyst layer, a state with high flowability similar to that of a liquid is assumed. However, in the membrane-electrode assembly in accordance with the present invention, the electrolyte resin is retained within the cavities of the central portion of shells of inorganic fine particles having the proton conductive material. Therefore, stable shape retention ability may be ensured. As a result, the electrolyte resin loaded into the cavities in the central portions of inorganic fine particles is loaded in a large amount into the particles and the proton conductive groups are exposed from a large number of through holes on the particle surface. As a result, the proton conductive material is prevented from being liquefied and from clogging the gas diffusion paths in the catalyst layer, and water retention ability is ensured by the proton conductive groups. Therefore, the decrease in power generation characteristic under low-humidity conditions that is observed when a typical polymer electrolyte having sulfonic acid groups in the structure is used as a proton conductive material is eliminated. Further, because the proton conductive material has shells of inorganic fine particles, even when excessive amount of water envelopes the electrolyte resin, the electrolyte resin does not swell in excess of the inner capacity of shells of the inorganic fine particles. Therefore, the electrolyte resin does not include the excessive amount of water. Further, due to the effect produced by the shape of particles of the proton conductive material, water discharge paths are ensured easier than when a typical catalyst layer is used in which an organic polymer electrolyte resin of indeterminate shape is uniformly dispersed and the resin adheres around the catalyst grains. As a result, the excessive water that has not been included in the electrolyte resin is discharged with good efficiency. Thus, the increase in water discharge ability may be attained due to a particulate shape and shells of the inorganic fine particles of the proton conductive material. Further, because the proton conductive material has shells of inorganic fine particles, gaps are present around the particles due to the shape of particles of the proton conductive material. As a result, gas diffusion ability within the catalyst layer may be increased with respect to that when a typical catalyst layer is used in which an organic polymer electrolyte resin of indeterminate shape is uniformly dispersed and the resin adheres around the catalyst grains. The above-described effects may be obtained when the proton conductive material is used only in the anode catalyst layer, but water distribution in the cathode catalyst layer may be also controlled by using appropriate amounts of the proton conductive material in the anode catalyst layer and cathode catalyst layer. Further, because the electrolyte resin has a Si—O skeleton and a strong polymer chain, the resin excels in mechanical properties and the proton conductive groups hardly leak to the outside of the proton conductive material. In addition, because the inorganic fine particles are from $SiO_2$, they have rigid shells. Therefore, shrinkage/expansion caused by water and heat balance is small and shape may be retained. Moreover, in the proton conductive material having such ion exchange capacity, by loading the electrolyte resin into the inorganic fine particles, it is possible to ensure water retention ability equal to or higher than that of the inorganic fine particles, and sufficient water retention ability may be demonstrated when the proton conductive material is used in a catalyst layer of a membrane-electrode assembly. In addition, the proton conductive material having the above-described average particle size and bulk density is optimum for applications to a catalyst layer of adequate thickness and a sufficient amount of the electrolyte resin may be loaded into the inorganic fine particles.

A process for manufacturing a proton conductive material of Example 1 of the present invention will be explained below. A total of 0.72 g of 3-mercaptopropyltrimethoxysilane (manufactured by Tokyo Kasei), which is a monomer having a precursor group of a sulfonic acid group, was added to 0.60 g of 3-(trihydroxysilyl)-1-propanesulfonic acid solution (manufactured by Gelest) with a concentration of 30 wt %, which is a monomer having a sulfonic acid group. Then, 0.10 g of microcapsules were added as hollow inorganic fine particles having through holes on the surface thereof. Then heating and pressure reduction (100 mm Hg, 70° C., 2 h) were performed to load the two aforementioned monomers into the microcapsules. Water contained in the solution was then vacuum distilled off at normal temperature and heating at 80° C. was performed for 3 h to polymerize the monomer. The sample obtained was dispersed in ion-exchange water, an appropriate amount of hydrogen peroxide was added, and the precursor groups were converted into the sulfonic acid groups, while stirring, for 5 days at 70° C. After the conversion, water was vacuum distilled off at normal temperature and vacuum drying was performed (100° C., 6 h). As a result, a proton conductive material that was a white solid body was obtained in an amount of 0.55 g.

Evaluation of electrolyte resin retention capacity will be described below. A total of 0.20 g of the proton conductive material in a fully filled state after the above-described manufacturing process had been completed was stirred for 2 h in 100 g of hot water at 100° C. to obtain an ion exchange capacity of 1.2 meq/g, that is, a value that exceeds 0.5 meq/g, which may be considered as a proton conduction capacity sufficient for utilization, for example, in an electrolyte membrane or catalyst layer of a fuel cell. Thus, it was found that the proton conductive material had a sufficient capacity to retain the electrolyte resin.

The evaluation of proton conductance will be explained below. The proton conductance of the proton conductive material in accordance with the present invention was carried out by complex impedance measurements. Thus, an impedance characteristic of an aqueous dispersion of a sample (H-Conductor) of the proton conductive material obtained in Example 1, and a proton conductance was calculated from the impedance characteristic value by using a cell constant. SI-1260 manufactured by Solartron was used to measure the complex impedance.

Impedance characteristics of an aqueous dispersion (10 mg/1 mL) of the H-Conductor, an aqueous dispersion (10 mg/1 mL) of zirconium phosphate, and distilled water were measured and proton conductance was calculated. The proton conductance of the aqueous dispersion of H-Conductor was $5.3 \times 10^{-4}$ S/cm, the proton conductance of the aqueous dispersion of zirconium phosphate was $3.4 \times 10^{-5}$ S/cm, and the proton conductance of distilled water was $9.0 \times 10^{-7}$ S/cm. These results demonstrated a high proton conductance of the proton conductive material in accordance with the present invention.

By admixing the proton conductive material in accordance with the present invention to a catalyst layer in a membrane-electrode assembly for use in a fuel cell, it is possible to enhance the power generation performance of the fuel cell and improve gas diffusability and generated water dischargeability of the catalyst layer. Further, by admixing the proton conductive material to an electrolyte membrane in a membrane-electrode assembly for use in a fuel cell, it is possible to enhance the power generation performance of the fuel cell. In addition, by admixing the proton conductive material to a dielectric sandwiched by a pair of electric conductor plates, it is possible to produce a capacitor having a high electrostatic capacity.

A process of manufacturing a proton conductive material of Example 2 of the present invention, which is different from that of Example 1, will be explained below. A total of 0.10 g of microcapsules were dispersed in 3 mL of ion-exchange water. A total of 1.54 g of 3-(trihydroxysilyl)-1-propane-sulfonic acid solution (manufactured by Gelest) with a concentration of 30 wt % was added as a monomer having a sulfonic acid group to the solution. Then heating and pressure reduction (100 mm Hg, 70° C., 2 h) were performed to load the aforementioned monomers into the microcapsules. Water contained in the solution was then vacuum distilled off at normal temperature and heating at 80° C. was performed for 3 h to polymerize the monomer. Washing with ion-exchange water was then performed three times and vacuum drying was performed (100° C., 6 h). As a result, a proton conductive material that was a white solid body was obtained in an amount of 0.36 g.

The fabrication of a membrane-electrode assembly of Example 3 of the present invention will be explained below. In the membrane-electrode assembly of Example 3, the proton conductive material produced in Example 2 was used. In Example 3, a catalyst ink produced under the below-described conditions by mixing the proton conductive material produced in Example 2, a catalyst (Pt), and a polymer electrolyte (Nafion®) was coated on both surfaces of an electrolyte membrane (thickness 20 μm) and dried. A gas diffusion layer was then formed and the membrane-electrode assembly of Example 3 was produced by the above-described method.

(Production Conditions)

Pt application density [anode electrode/cathode electrode]: $(0.15 \text{ mg/cm}^2)/(0.40 \text{ mg/cm}^2)$.

Supported amount of Pt: both of the anode electrode and cathode electrode are 45%.

Weight ratio of nafion to the catalyst support: both of the anode electrode and cathode electrode are 0.75.

Weight ratio of proton conductive material to the catalyst support [anode electrode/cathode electrode]: 0.75/0.0.

The fabrication of a membrane-electrode assembly of Example 4 of the present invention will be explained below. The membrane-electrode assembly of Example 4 also used the proton conductive material produced in Example 2. In Example 4, a catalyst ink produced under the below-described conditions by mixing the proton conductive material produced in Example 2, a catalyst (Pt), and a polymer electrolyte (Nafion®) was coated on both surface of an electrolyte membrane (thickness 20 μm) and dried. A gas diffusion layer was then formed and the membrane-electrode assembly of Example 4 was produced by the above-described method.

(Production Conditions)

Pt application density [anode electrode/cathode electrode]: $(0.15 \text{ mg/cm}^2)/(0.40 \text{ mg/cm}^2)$.

Supported amount of Pt: both of the anode electrode and cathode electrode are 45%.

Weight ratio of nafion to the catalyst support: both of the anode electrode and cathode electrode are 0.75.

Weight ratio of proton conductive material to the catalyst support [anode electrode/cathode electrode]: 0.375/0.375.

Power generation performance of the membrane-electrode assemblies of Examples 3, 4 was evaluated using a Comparative Example. In the Comparative Example, a catalyst ink produced under the below-described conditions by mixing a catalyst (Pt) and a polymer electrolyte (Nafion®) was coated on both surface of an electrolyte membrane (thickness 20 μm) and dried. A gas diffusion layer was then formed and the membrane-electrode assembly of Comparative Example was produced by the above-described method.

(Production Conditions)

Pt application density [anode electrode/cathode electrode]: $(0.15 \text{ mg/cm}^2)/(0.40 \text{ mg/cm}^2)$.

Supported amount of Pt: both of the anode electrode and cathode electrode are 45%.

Weight ratio of nafion to the catalyst support: both of the anode electrode and cathode electrode are 0.75.

Weight ratio of proton conductive material to the catalyst support [anode electrode/cathode electrode]: 0.0/0.0.

Figure 3:
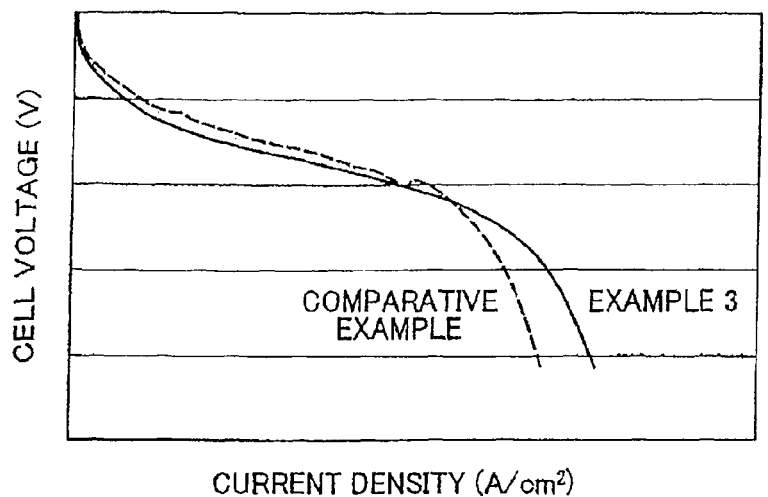
FIG. 3 is a graph illustrating the measurement results obtained in Example 3 and Comparative Example in evaluating the power generation performance of the membrane-electrode assembly in accordance with the present invention.

Current values in the membrane-electrode assemblies of Example 3 and Comparative Example produced under the above-described production conditions were measured by varying the applied voltage, while supplying nitrogen gas and air, under the below-described measurement conditions. The results are shown in FIG. 3.

(Measurement Conditions)

Cell temperature: 70° C.

Gas conditions [anode electrode/cathode electrode]: 70° C.

Low-humidity nitrogen/70° C. low-humidity air application voltage: 0.1 V to 1.0 V (voltage applied to the anode electrode with respect to the cathode electrode).

As shown in FIG. 3, the membrane-electrode assembly of Example 3 that contained the proton conductive material in the catalyst layer of the anode electrode demonstrated power generation performance under low-humidity conditions that was higher than that of the membrane-electrode assembly of the Comparative Example that contained no proton conductive material in the catalyst ink. This result indicates that the proton conductive material in accordance with the present invention improves water retention ability, water dischargeability, and gas diffusability of the anode electrode, thereby making it possible to improve power generation performance of the membrane-electrode assembly.

Figure 4:
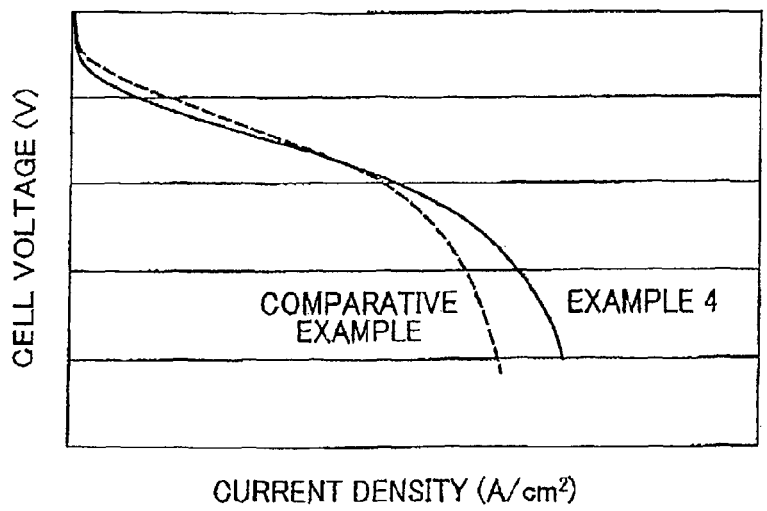
FIG. 4 is a graph illustrating the measurement results obtained in Example 4 and Comparative Example in evaluating the power generation performance of the membrane-electrode assembly in accordance with the present invention.

Current values in the membrane-electrode assemblies of Example 4 and Comparative Example produced under the above-described production conditions were measured by varying the applied voltage, while supplying nitrogen gas and air, under the below-described measurement conditions. The results are shown in FIG. 4.

(Measurement Conditions)

Cell temperature: 50° C.

Gas conditions [anode electrode/cathode electrode]: 50° C.

Low-humidity nitrogen/50° C. low-humidity air application voltage: 0.1 V to 1.0 V (voltage applied to the anode electrode with respect to the cathode electrode).

As shown in FIG. 4, the membrane-electrode assembly of Example 4 that contained the proton conductive material in the catalyst layers of the anode electrode and cathode electrode demonstrated power generation performance under low-humidity conditions that was higher than that of the membrane-electrode assembly of the Comparative Example that contained no proton conductive material in the catalyst ink. This result indicates that the proton conductive material in accordance with the present invention improves water retention ability, water dischargeability, and gas diffusability of the anode electrode, thereby making it possible to improve power generation performance of the membrane-electrode assembly.

While the invention has been described with reference to example embodiments thereof, it is to be understood that the invention is not limited to the described embodiments or constructions. To the contrary, the invention is intended to cover various modifications and equivalent arrangements. In addition, while the various elements of the disclosed invention are shown in various example combinations and configurations, other combinations and configurations, including more, less or only a single element, are also within the scope of the appended claims.

The invention claimed is:

1. A proton conductive material in the form of microcapsules, comprising hollow inorganic fine microcapsules that have through holes on a surface of the hollow inorganic fine microcapsules, and that are filled with an electrolyte resin.

2. The proton conductive material according to claim 1, wherein the electrolyte resin is exposed on the surface of the proton conductive material via the through holes.

3. The proton conductive material according to claim 1, wherein the electrolyte resin has a Si—O skeleton.

4. The proton conductive material according to claim 1, wherein the inorganic fine microcapsules are $SiO_2$.

5. The proton conductive material according to claim 1, further comprising an ion exchange capacity higher than an ion exchange capacity of the inorganic fine microcapsules.

6. The proton conductive material according to claim 1, wherein the ion exchange capacity is equal to or higher than 0.5 meq/g.

7. The proton conductive material according to claim 1, wherein an average microcapsule size is 0.1 to 10 μm.

8. The proton conductive material according to claim 1, wherein a bulk density of the inorganic fine microcapsules is equal to or less than 20% a true density of the inorganic fine microcapsules.

9. The proton conductive material according to claim 8, wherein a bulk density of the inorganic fine microcapsules is equal to or higher than 5% a true density of the inorganic fine microcapsules.

10. A membrane-electrode assembly having the proton conductive material according to claim 1, comprising:
　　an anode electrode having an anode catalyst layer, provided on one surface side of a solid polymer electrolyte membrane; and
　　a cathode electrode having a cathode catalyst layer, provided on the other surface side of the solid polymer electrolyte membrane,
　　wherein at least the anode catalyst layer from among the pair of catalyst layers contains the proton conductive material.

11. The membrane-electrode assembly according to claim 10, wherein both the anode catalyst layer and the cathode catalyst layer contain the proton conductive material.

\* \* \* \* \*

UNITED STATES PATENT AND TRADEMARK OFFICE
CERTIFICATE OF CORRECTION

PATENT NO. : 8,470,286 B2  
APPLICATION NO. : 12/678886  
DATED : June 25, 2013  
INVENTOR(S) : Tatsuo Fujinami et al.

Page 1 of 1

It is certified that error appears in the above-identified patent and that said Letters Patent is hereby corrected as shown below:

Title Page, item [54] and in the specification, column 1, in the title, change "PROTON CONDUCTIVE MATERIAL" to -- PROTON CONDUCTIVE MATERIAL, METHOD FOR MANUFACTURING PROTON CONDUCTIVE MATERIAL, AND MEMBRANE-ELECTRODE ASSEMBLY CONTAINING PROTON CONDUCTIVE MATERIAL --

Signed and Sealed this  
Twenty-ninth Day of October, 2013

Teresa Stanek Rea  
*Deputy Director of the United States Patent and Trademark Office*

UNITED STATES PATENT AND TRADEMARK OFFICE
CERTIFICATE OF CORRECTION

PATENT NO. : 8,470,286 B2
APPLICATION NO. : 12/678886
DATED : June 25, 2013
INVENTOR(S) : Fujinami et al.

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 560 days.

Signed and Sealed this
Eighth Day of September, 2015

Michelle K. Lee
*Director of the United States Patent and Trademark Office*